United States Patent
Lindell et al.

(10) Patent No.: US 10,664,604 B2
(45) Date of Patent: May 26, 2020

(54) SECURING SQL BASED DATABASES WITH CRYPTOGRAPHIC PROTOCOLS

(71) Applicants: Unbound Tech Ltd., Petah Tiqva (IL); Bar-Ilan University

(72) Inventors: Yehuda Lindell, Givat Shmuel (IL); Guy Pe'er, Talmey Yechiel (IL); Michael Kraitsberg, Rehovot (IL); Valery Osheter, Ashdod (IL); Alex Presman, Ramat Gan (IL)

(73) Assignees: UNBOUND TECH LTD., Petah Tiqva (IL); BAR-ILAN UNIVERSITY, Ramat Gan (IL)

(*) Notice: Subject to any disclaimer, the term of this patent is extended or adjusted under 35 U.S.C. 154(b) by 130 days.

(21) Appl. No.: 15/780,363

(22) PCT Filed: Nov. 30, 2016

(86) PCT No.: PCT/IL2016/051285
§ 371 (c)(1),
(2) Date: May 31, 2018

(87) PCT Pub. No.: WO2017/094009
PCT Pub. Date: Jun. 8, 2017

(65) Prior Publication Data
US 2018/0357427 A1 Dec. 13, 2018

Related U.S. Application Data

(60) Provisional application No. 62/262,458, filed on Dec. 3, 2015.

(51) Int. Cl.
G06F 21/00 (2013.01)
G06F 21/60 (2013.01)
(Continued)

(52) U.S. Cl.
CPC ........ *G06F 21/602* (2013.01); *G06F 16/2455* (2019.01); *G06F 21/6227* (2013.01); *H04L 9/085* (2013.01)

(58) Field of Classification Search
CPC .................................................. G06F 21/602
See application file for complete search history.

(56) References Cited

U.S. PATENT DOCUMENTS

| 7,995,765 B2* | 8/2011 | Schneider ............... H04L 9/085 380/277 |
| 9,118,631 B1* | 8/2015 | Yung ....................... H04L 9/008 |

(Continued)

OTHER PUBLICATIONS

International Search Report issued in International Application No. PCT/IL2016/051285, dated Mar. 20, 2017.
(Continued)

*Primary Examiner* — Josnel Jeudy
(74) *Attorney, Agent, or Firm* — Alphapatent Associates, Ltd; Daniel J. Swirsky (57) ABSTRACT

The subject matter discloses a method operated on a computerizing system comprising generating two secret shares of at least some of the data fields in a database, loading data fields of the database into two database copies, wherein one secret share of the two secret shares is loaded into one database copy and another secret share of the two secret shares is loaded into another database copy, receiving a request to perform a query in the database, processing said query on the database copies, wherein the database fields employed by the query process and the query results remain secret during processing, and revealing the secret query results.

13 Claims, 8 Drawing Sheets

(51) Int. Cl.
*G06F 16/2455* (2019.01)
*G06F 21/62* (2013.01)
*H04L 9/08* (2006.01)

(56) References Cited

U.S. PATENT DOCUMENTS

| | | | | |
|---|---|---|---|---|
| 2007/0195948 | A1* | 8/2007 | Bunimov | H04L 9/065 380/28 |
| 2010/0185847 | A1 | 7/2010 | Shasha | |
| 2013/0191650 | A1* | 7/2013 | Balakrishnan | G06F 21/6227 713/190 |
| 2014/0013439 | A1* | 1/2014 | Koike | G06F 21/6218 726/26 |
| 2014/0164758 | A1 | 6/2014 | Ramamurthy | |
| 2014/0372607 | A1* | 12/2014 | Gladwin | H04L 67/16 709/224 |
| 2015/0149773 | A1 | 5/2015 | Kerschbaum | |
| 2015/0244522 | A1* | 8/2015 | Cheruvath | H04L 9/0894 713/183 |

OTHER PUBLICATIONS

Written Opinion of the International Searching Authority issued in International Application No. PCT/IL2016/051285, dated Mar. 20, 2017.

Sven Laur, et al, "Round-Efficient Oblivious Database Manipulation", International Association for Cryptologic Research, Aug. 9, 2011, pp. 1-16, v01.

Dan Bogdanov, "Sharemind: Programmable Secure Computations with Practical Applications", Phd Thesis, Jan. 1, 2013, pp. 1-138, Retrieved from the Internet:URL:http://dspace.ut.ee/bitstream/handle/10062/29041/bogdanov_dan_2.pdf?sequence=5&isAllowed=y.

Dan Bogdanov, et al, "A Universal Toolkit for Cryptographically Secure Privacy-Preserving Data Mining", Intelligence and Security Informatics, ISBN: 978-3-642-30427-9, May 29, 2012, pp. 112-126, Springer, Berlin Heidelberg, Germany.

Yutaka Nishihaki, et al, "Securing a B+tree for Use with Secret-Shared Databases", Databases in Nethorked Information Systems, ISBN: 978-3-642-37133-2, Mar. 25, 2013, pp. 246-261, Springer, Berlin Heidelberg, Germany.

* cited by examiner

Fig. 8 ial application No.
SECURING SQL BASED DATABASES WITH CRYPTOGRAPHIC PROTOCOLS

CROSS REFERENCE TO RELATED APPLICATIONS

The present application is a § 371 National Phase application based on PCT/IL2016/051285 filed Nov. 30, 2016, which claims the benefit of U.S. Provisional application No. 62/262,458 filed Dec. 3, 2015 the subject matter of each of which is incorporated by reference in their entirety.

FIELD OF THE INVENTION

The present invention generally relates to database encryption, more particularly a database encryption method and system providing a set of protocols designed to conduct secure query operations on the encrypted data without decrypting it.

BACKGROUND OF THE INVENTION

Databases and business intelligence have become ubiquitous in business, industry, and education. Connecting data resources to communications network increases the productivity of employees by providing access to information at any time from any place. In the business environment, existing today, the access to applications managing information stored in databases is allowed from the network of the business unit, company, or the enterprise. In some cases, connecting to databases and information is also allowed via remote access by utilizing the internet infrastructure.

With the development of the computer technology nowadays, the means to exploit security breaches has grown. In multiple cases, strong encryption technologies provide some level of protection. Yet, breaches to databases occur rather often. Furthermore, unauthorized people trying to access sensitive data are not limited to merely utilizing security breaches to data in rest which is stored in the databases. In some cases, sophisticate utilities such as statistical tools may be used to analyze data in use. Such data in use may be data uploaded to the database or data exposed during SQL operations. Protecting data during SQL operation provides a big challenge to security engineers and data administrators since the encrypting and decrypting methods utilized in the data in use are required to be compatible with the encrypting and decrypting methods utilized in the data stored in the database.

SUMMARY OF THE INVENTION

The present invention discloses a method performed on a computerized system for encrypting SQL based databases and for providing a set of encrypted protocols designed to perform SQL operations on the database without ever decrypting the data. Such SQL operations can be performed according to queries comprising query's reserved words, terms, commands and conditions used for searching data and information in databases. In some cases, such queries may comprise tables, query trees, code, or scripts used for the data and information searching. The disclosed method and the related computerized system can provide a database encryption beginning from the database creation by generating two database copies, which in some cases be empty, and then copying the database copies into two separated servers. The computerized system can also be configured to encrypt the data loaded into the two database copies, wherein the and the secret shares can be split between the two database copies. In some cases, the encryption key for one copy of the database may be XOR shared between the two servers. For example, a value in the database can undergo a XOR operation with a random number x. The random number "x" may be one share stored in one database copy and the result of the XOR operation with the value "x" may be the other share stored in the other database copy, effectively achieving one-time pad encryption. In some cases, methods of additive secret sharing may be also utilized to encrypt the data in the database copies. In some other cases, additional methods such as probabilistic searchable encryption may be utilized to encrypt values in the database.

The computerized system can also be configured to perform the query operations on the database upon receiving a query tree, comprised of the query command types and the database's tables participating in the query. The computerized system can also be configured to prepare secured versions of the query tree. Thus, the names of the tables, columns and conditional values of the query may be encrypted at the secured versions of the query tree. In some embodiments of the present invention, the system may comprise an SMPC (Secured Multi-Party Computation) proxy server designed to receive the query operations and generate the secured query trees. Once the secured versions of the query tree are generated, the computerized system can conduct an encrypted query operation by sending the secured query trees to the servers hosting the database copies. The servers hosting the database copies can receive the secured query trees, determine which encrypted values meet the query operations, by conducting secure multiparty computation protocols in order to process the query, and return the final results to a third server. The servers hosting the database copies can also protect against leakage based on analyzing the access patterns over multiple queries by generating a new encrypted copy of the database in random order.

BRIEF DESCRIPTION OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION OF THE INVENTION

The present invention discloses a method and a computerized system for securing SQL-based databases and providing a set of encrypted protocols designed to secure the query operations performed on said database. The method provides encrypted protocols designed to encrypt the data loaded into the database, in such a format which allows performing SQL operations on the encrypted data. The method of the present invention also discloses encryption protocols, denoted as encrypted mix protocols, which create a new, encrypted and shared copy of the database, structured in a random order to allow standard SQL operations on the database in a secure fashion. Thus, executing data searching on a random order of the encrypted data hides the values of the data fields and hides the original locations of the data in the new copy. For example, in case an SQL aggregate function is executed to count the number of persons which are above the age of 25 in a certain database, said encrypted mix protocols can create an encrypted copy of the database under new sharing of the data in a random order, execute the SQL aggregate function and output the results. Then, the same SQL aggregate function can be used again to search for persons which are above the age of 25. The encrypted mix protocols may recreate an encrypted copy of the database under a new sharing of the data in a random order, which may not necessarily be at the same order as the previous search operation, although that the same SQL query is processed.

In some embodiments of the present invention, the two servers comprising the database, denoted as S1 and S2, may be configured to communicate via a communications network such as internet, LAN, WAN and the like. The computerizing system may also comprise a third server S3 utilized to accelerate secure computation protocols, and a SMPC (Secure Multi-Party Computation) proxy server designed to receive the queries, encrypt the queries, send the encrypted queries to S1, S2, and S3 for processing the queries, and return the results. In some cases, S3 may also comprise a copy of the database.

Figure 1:
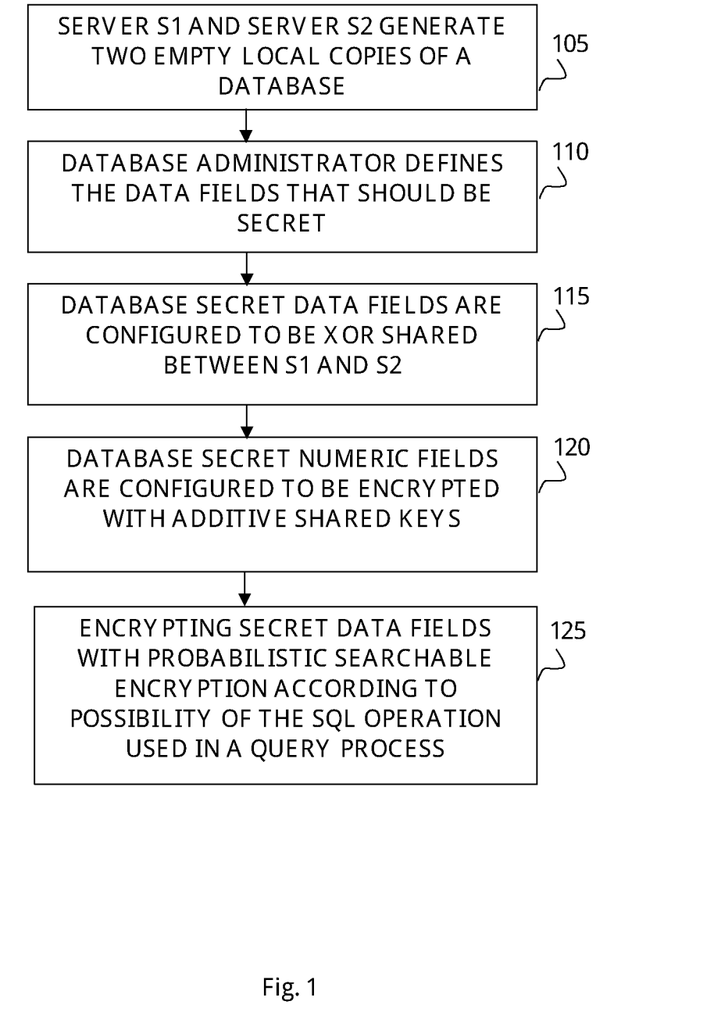
FIG. 1 discloses a process of configuring the encryption methods of the data, during the process of loading the data into the database, according to exemplary embodiments of the present invention.

FIG. 1 discloses a method of configuring the encryption methods of the data, while loading the data into the database, according to exemplary embodiments of the present invention. In step 105, S1 and S2 create two local copies of an empty databases. In some cases, such local copies may be created by an automated process which creates two similar databases. In some other cases, one local copy can be created in one of the servers, S1 or S2, and then the empty database can be copied to the other server. In step 110, an administrator of the database can define the secret fields in the database, the fields required to remain secret. The secret fields in the database remain encrypted and the value of the fields remains hidden. For example, the database administrator can specify that the date of the transaction in the table remain unhidden. In step 115, the database secret fields are XOR shared between server S1 and server S2. For example, a value x is XOR shared by choosing a random $X_1 \in \{0,1\}^{|x|}$ and setting $X_2 = X \oplus X_1$. Where $\oplus$ represents the XOR operation, and $|x|$ represents the length of the random number $X_1$, and the $X_1$ and $X_2$ are the shares.

In step 120 the database's secret numeric fields are also encrypted using additive secret sharing. In some cases, a number of additive sharing methods may be utilized to encrypt the secret numeric fields, in accordance with the possibility of one or more predefined SQL queries to be used on that value, during and SQL operation. For example, in case of fields on which it is possible that the SUM SQL aggregate function will be used, the fields may be shared using additive sharing, for example using modulo $2^{128}$. Thus, the value v is additively shared by choosing a random $v_1 \in \{0,1\}^{128}$ where 128 represents the length of value $v_1$, and by setting $v_2 = v - v_1 \mod 2^{128}$. In such a case, the values $v_1$ and $v_2$ represent the shares stored by S1 and S2. Additional additive sharing method may be applied on numeric fields where it is possible that STDEV SQL aggregate function will be used. The secret fields may be shared using additive sharing of the squares of the value modulo $2^{128}$. Thus, the square of a value v is additively shared by choosing a different random $v_1 \in \{0,1\}^{128}$, where 128 represents the length value $v_1$, and by setting $v_2 = v_2 - v_1 \mod 2^{128}$. In such a case, the values $v_1$ and $v_2$ are the shares stored by S1 and S2.

Step 125 discloses encrypting secret database's fields by utilizing probabilistic searchable encryption on the secret fields which can be used for an EQUALS search function and MATCH operations of any type). Such MATCH operations are used in many SQL operations, including GROUP BY, JOIN, SET, and COUNT-DISTINCT. Any probabilistic searchable encryption method may be used. For different operations, different probabilistic searchable encryption keys are needed. Thus, the process may generate three encryption keys, $K_1$, $K_2$, and $K_3$. The process of generating the three keys encryption may utilize a pseudorandom key $K_x$ which can be obtained by $K_x = F_{\tilde{k}}(x)$. The function F is any pseudorandom function. An exemplary method defines $K_x = F_{\tilde{k}}(x)$ by computing $F_{\tilde{k}}(x) = H'(\tilde{K} \cdot H(x))$, where the function $H: \{0,1\}^* \to G$ is a hash function (e.g., a function modeled as a random oracle), H' is a randomness extractor, and G is an Elliptic curve group of order q. In some cases, by giving a value x, $K_x = F_{\tilde{k}}(x)$ can be computed by the SMPC proxy server in an MPC process conducted with S1 and S2. When $K_x$ is obtained, three encryption keys are derived from $K_x$. These may be computed as follows:

$K_1$=SHA256(1∥$K_x$) truncated to 80 bits $K_2$=SHA256(2∥$K_x$) of length 256 bits (size of group order q for Elliptic Curve group)

$K_3$=SHA256 (3∥Schema Name II Table Name II Column Name II $K_x$)

Figure 3:
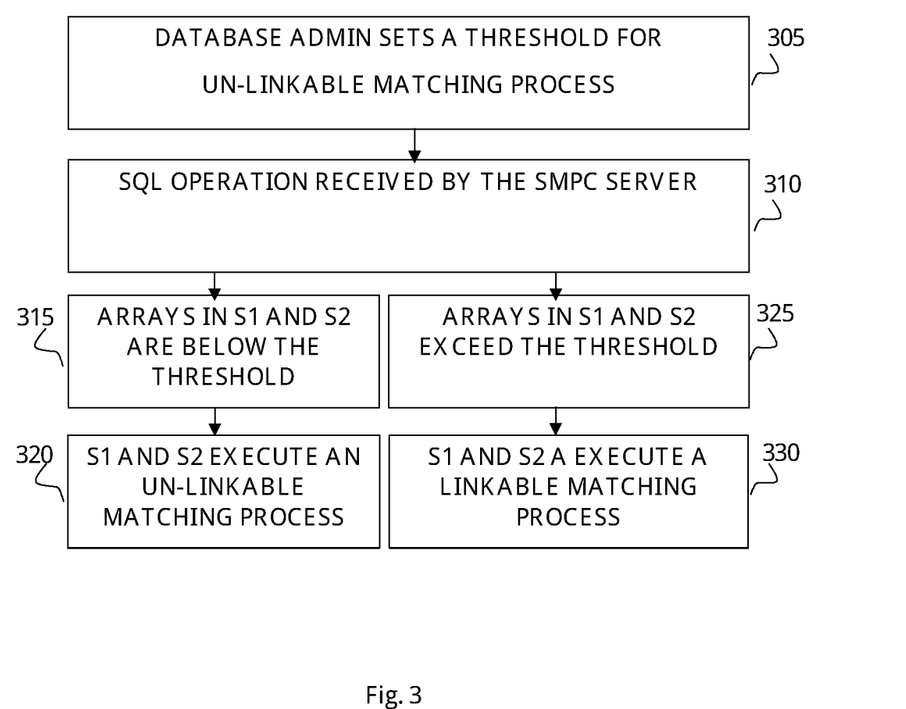
FIG. 3 discloses a secure protocol configured to enable executing SQL operations in a secured fashion without revealing the links between the values of the database nor the structure of the database, according to exemplary embodiments of the present invention.

In some cases, the process may encrypt the database's fields with probabilistic searchable encryptions using the keys $K_1$, $K_2$ and $K_3$, according to the sharing method performed on the fields. For example:

$K_1$ may be used in secret fields which can participate in a MATCH operation of any type, the value $K_1$ is XOR shared between S1 and S2 and can be used in case of a linkable matching process, defined in FIG. 3

$K_2$ may be used when the probabilistic searchable encryption is applied on the secret fields and the query involves an SQL MATCH operation of any type, the value $K_2$ is additively shared between S1 and S2 modulo q, where q is the order of the Elliptic curve group being used, and can be used in case of an un-linkable matching process, defined in FIG. 3

$K_3$ may be used for the probabilistic searchable encryption search at the secret fields for which it is possible to search by EQUALS. The fields can be encrypted using any searchable encryption method with key $K_3$. An exemplary method is as follows:

Choose a random $y \in \{0,1\}^{80}$

Compute $z = AES_{K_3}(y)$ and let $\tilde{z}$ be the first 64 bits of z

The encrypted value = $(y:\tilde{z})$

Figure 2:
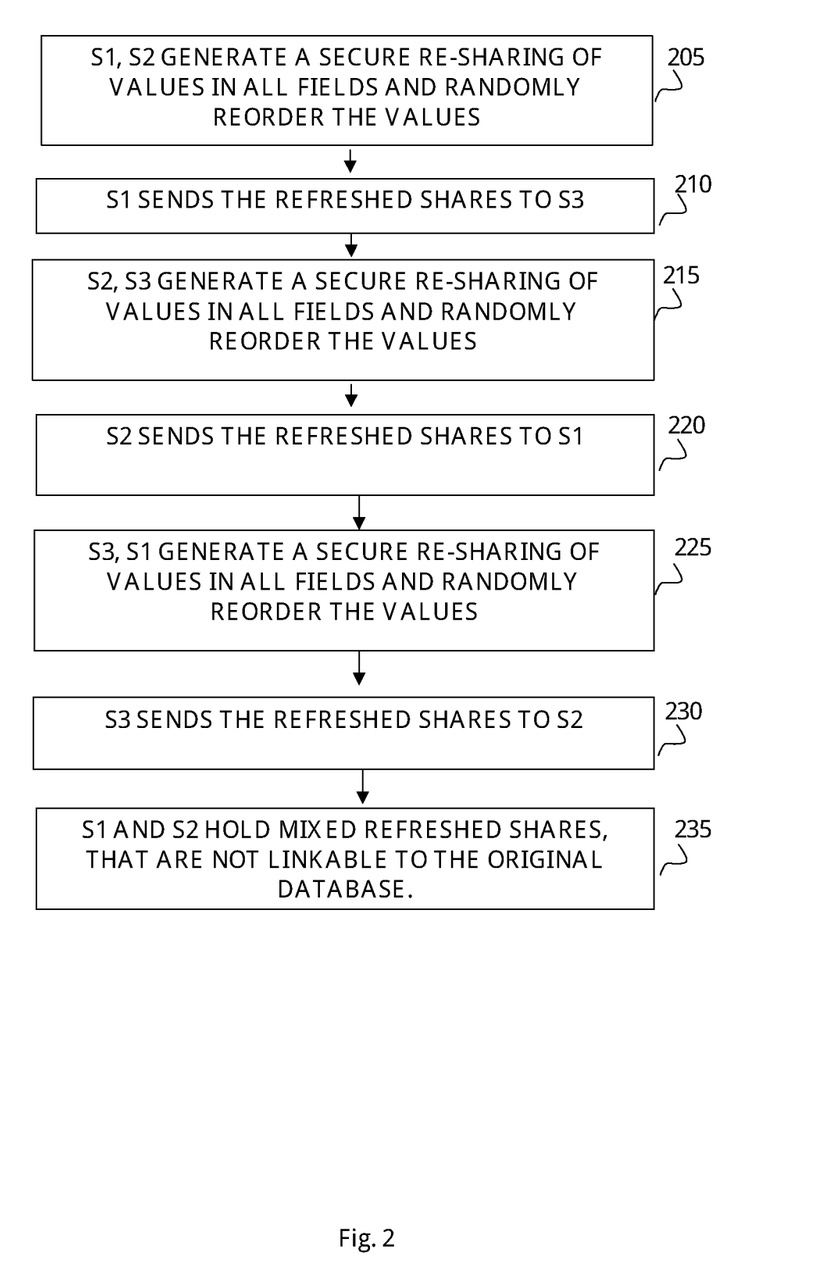
FIG. 2 discloses an encrypted mix protocol designed to generate another encrypted copy of the database under a new sharing of the data in a random order, according to exemplary embodiments of the present invention.

The method discloses in the present invention may also comprise a searchable-encryption process which utilizes the key $K_3$ as a searchable-encryption key. Thus, in order to perform a search operation such as EQUALS for a value x in the database using a searchable-encryption process, the SMPC proxy server can compute $K_x$ using an MPC procedure on data fields distinctly stored at S1 and S2, then compute $K_3$ locally, and then provide $K_3$ to S1 and S2. Upon receiving the key $K_3$, S1 and S2 can locally search for the value by testing for each pair $(y:\tilde{z})$ if the first 64 bits of $AES_{K_3}(y)$ equals $\tilde{z}$. FIG. 2 discloses an encrypted mix protocol designed to generate an encrypted copy of the database under a new sharing of the data in a random order, according to exemplary embodiments of the present invention. In step 203, S1, S2 and S3 generate shared keys, such that $K_{12}$ is an AES key shared between S1 and S2, $K_{13}$ is an AES key shared between S1 and S3, and $K_{23}$ is an AES key shared between S2 and S3. In some cases, the shared AES key may be already in place and the generation process may be omitted. For example, S1, S2, and S3 may utilize the AES shared keys from a previous operation of the encrypted mix protocol. In some cases, the shared keys are used in another method for securely generating pseudorandom values.

In step 205, S1, S2 generate shared key $K_{12}$ to create a secure re-sharing of the values in the secret fields. The secure re-sharing process take place between each pair of servers. The process of re-sharing the values in the secret fields utilizes S3 as an auxiliary server for exchanging the shared encrypted values. In some cases, S1 and S2 may initiate the process by utilizing their shared key $K_{12}$ to conduct a secure re-sharing process defined as follows:

Creating new XOR shares of values between S1 and S2

Creating new additive shares of values between S1 and S2

Creating new shares of values held by both S1 and S2

When the new shares of values are generated S1 and S2 may utilize their shared AES key $K_{12}$ to reorder their shared values.

In step 210, S1 sends the reordered values resulted from the re-sharing process between S1 and S2 to S3, and thereby S2 and S3 hold a sharing of the database. In step 215 S2 and S3 can operate the same secure re-sharing process as elaborated above by generating key $K_{23}$. Thus, S2 and S3 create new XOR shares, create new additive shares, create new shares of values held by both S2 and S3 and then utilize the key $K_{23}$ to reorder their shared values. In step 220 S2 sends the reordered values resulted from the secure re-sharing process between S2 and S3 to S1, and thereby S1 and S3 hold a sharing of the database. In step 225 the secure re-sharing process between S3 and S1 takes place generating key $K_{13}$. Thus, S3 and S1 create new XOR shares, create new additive shares, create new shares of values held by both S3 and S1 and then utilize the key $K_{13}$ to reorder their shares. In step 230 S3 sends the reordered values resulted of the re-sharing process between S3 and S2 to S2.

In step 235, the secure re-sharing processes is complete, S1 and S2 hold mixed refreshed shares, that are not linkable to the original database, and the shared values are randomly reordered in a fashion with no remained links from the transactions at the new copy to the place the transaction were located in the previous copy or the original copy. In some cases, known algorithms or procedures may be utilized for this task. For example, in some embodiments of the present invention the Fisher-Yates algorithm may be utilized to reorder the shared values within the database.

FIG. 3 discloses a secure protocol configured to enable executing SQL MATCH operations in a secured fashion without revealing the links between the values of the database to S1, S2, S3 nor to the SMPC proxy server, according to exemplary embodiments of the present invention. Step 305 discloses setting a threshold for the un-linkable matching process. The un-linkable matching process may be defined as a process enabling SQL MATCH operations whereas the links between the values of the database and the structure of the database remain hidden to S1, S2, S3 nor to the SMPC proxy server. Thus, the database administrator may input a threshold for executing the un-linkable matching process into a computerized device communicating with the servers S1 and/or S2. In some cases, such a threshold may be a numeric value which defines the minimal size of the arrays for which the un-linkable matching process can be activated. For example, assuming A and B are two arrays of data which are about to undergo an SQL MATCH operation. Then, in case the overall size of the arrays A and B is below the set threshold, the un-linkable matching process may take place. In case the overall size of the arrays A and B is above the set threshold, the linkable matching process may take place. The linkable matching process is more efficient, but reveals some patterns of the data to S3 only. It is thus used when the arrays to be matched exceed the threshold.

In step 310 the SMPC proxy server receives an SQL based query to the database located at S1 and S2. The query may comprise expressions, commands, clauses, queries commands, and the like, in order to receive data stored in the database. In addition, S3 can verify whether the two arrays of data participating in the received SQL MATCH operation meet the threshold for the un-linkable matching process. For example, in case the GROUP BY clause which extracts rows from array A and array B which have common values into a smaller set of rows, appeared in a particular query, S3 can verify if the overall size of arrays A and B exceeds the set threshold.

Step 315 discloses determining whether the shared values participating in the received SQL MATCH operation meet the threshold and the un-linkable matching process can take place. In case the shared values are below the threshold, step 320 is performed, in which S1 and S2 execute the un-linkable matching process. The un-linkable matching process may be performed by running a secure MPC protocol between S1, S2 and S3 that outputs all pairs of i and j so that A[i]=B[j].

Step 325 discloses the case in which the shared values participating in the received SQL MATCH operation exceeds the threshold and the linkable matching process can therefore take place. In step 325, performed in case the shares exceed the threshold, S1 and S2 execute the linkable matching process. The linkable matching process may perform the following steps:

1. S1 and S2 have XOR shares of deterministically encrypted values A[i] of the array A and B[j] of the array B, where i and j are countable numbers.
2. S1 and S2 send their shares to S3
3. S3 performs a XOR operation on the shares which outputs deterministically encrypted values.
4. S3 identifies a specific pair of i and j so that A[i]=B[j].
5. S3 returns the matched values to S1, S2

Figure 4:
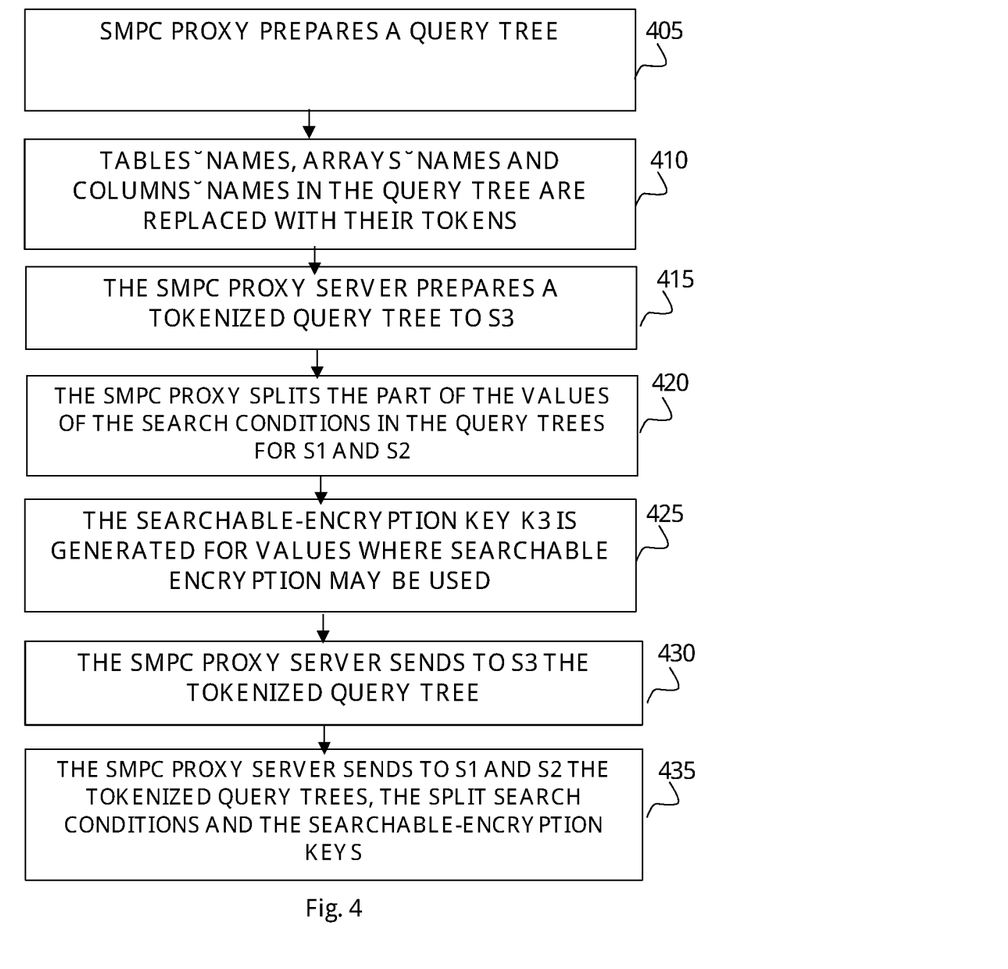
FIG. 4 discloses a process conducted by an SMPC proxy server for preparing tokenized query trees and send them to S1, S2 and S3, according to exemplary embodiments of the present invention.

FIG. 4 discloses a process conducted by an SMPC server for preparing tokenized query trees and send them to S1, S2 and S3, according to exemplary embodiments of the present invention. The SMPC server may be a proxy server. Step 405 discloses the SMPC proxy server preparing the query tree for the SQL query. Such an SQL query can be generated by a computerized device operating an SQL application, designed to search in SQL databases and configured to search in the SQL database stored in S1 and S2. For example, an application operated on a computerized device can be used to search all people above age 20 in a certain SQL database. In such case, the SQL application connected to the database may prepare the SQL query tree and send to the SMPC proxy server. The query tree may comprise the SQL query operations and the related tables with the relations that are used in the query. A query table can comprise at least one SQL command and the related database's tables in a relational structure for executing the commands. In some cases, the relational structure of the database's table may present which command or operator is called in the query. In some cases, the database tables may be presented in the query tree by the tables' name. In some other cases, the database tables may be presented in the query tree by a number.

In step 410, the SMPC proxy server replaces the table names or numbers and/or column names or numbers of the database's tables in the query tree to tokens. Such tokens may be an encrypted form of the name or the number. Such tokens may be created by applying a deterministic encryption such as a pseudorandom function on the plaintext values. In some cases, the tokenization process may comprise adding of more information In step 415, the SMPC proxy server prepares the tokenized query tree to S3. Such a tokenized query tree may be a query tree where at least some of the tables' names or arrays' names in the query tree are replaced with tokens, and in some cases, the values in the search conditions that assemble a portion of the tokenized query tree sent to S3 may be removed. For example, in case a tokenized query tree comprise the query WHERE age >20, wherein the age represents an array name comprising the ages in a database, the tokenized query tree sent to S3 can comprise the WHERE clause wherein the search condition value 20 may be removed. In step 420, the SMPC proxy server splits the part of the values of the search conditions in the tokenized query tree into random shares and prepares two tokenized query trees for S1 and S2, wherein the values in the search conditions are shared between the two tokenized query trees. For example, a threshold for a WHERE clause can be split into two additive shares modulo $2^{128}$, whereas one additive share is added to the tokenized query tree passed to S1 and one additive share is added to the tokenized query tree passed to S2. In some cases, different splitting methods may be utilized for the different condition values, in accordance with the SQL function type. For example, the threshold for SUM function and AVG function for HAVING clause can be passed as two additive shares modulo $2^{128}$, the threshold for STDEV function for HAVING clause can be passed as two additive shares modulo $2^{128}$ of the square of the threshold.

In some cases, some of the values in the search conditions may be split into XOR shares wherein each XOR share may be added to a tokenized query tree. Step 425 discloses adding the key $K_3$ to the tokenized query trees of S1 and S2, in cases a searchable-encryption may take place for processing WHERE EQUALS clauses. Thus, for each value which a searchable-encryption may be used, a key $K_3$ is generated and added instead of the original condition values to the tokenized query tree of S1 and in the tokenized query tree of S2.

Step 430 discloses the SMPC proxy server sending the tokenized query tree to S3 and step 435 shows the SMPC proxy sends the tokenized query tree prepared to S1 to S1 and the tokenized query tree prepared to S2 to S2.

Figure 5:
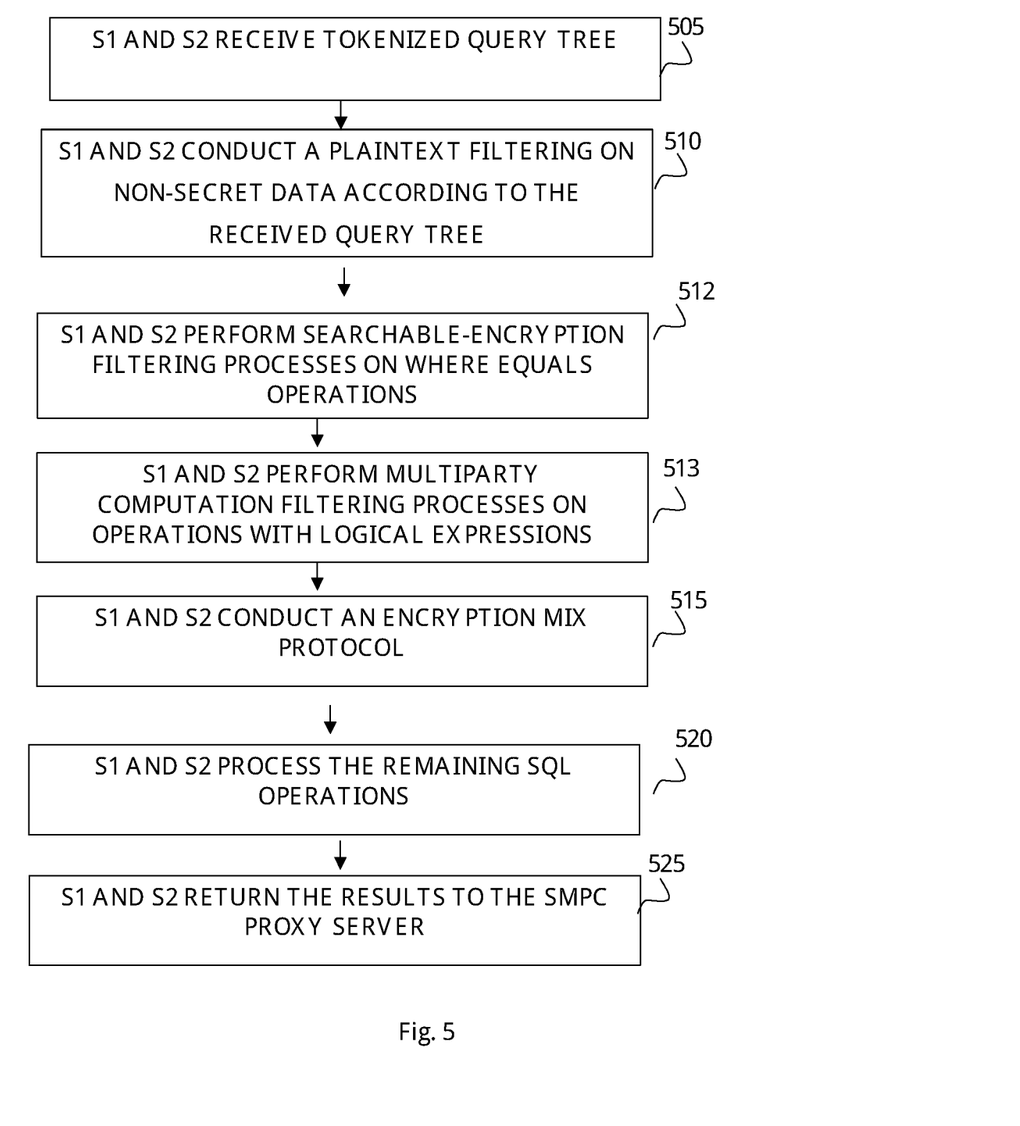
FIG. 5 discloses a method for processing an SQL query, according to exemplary embodiments of the present invention.

FIG. 5 discloses a method of processing an SQL query, according to exemplary embodiments of the present invention. Step 505 discloses S1 and S2 receiving a query tree. In some cases, the query tree may be a tokenized query tree received from the SMPC proxy server, as defined above. In step 510, S1 and S2 receive the tokenized query tree and initiate a plaintext filtering process in order to search data fields by attributes that are not encrypted. For example, S1 and S2 can filter out fields in database table which contain date. In such a case, if the query includes WHERE DATE >1.1.2000 then each of S1 and S2 retrieve all transactions in the database with date being 1.1.2000 or later. In step 512, S1 and S2 perform searchable-encryption filtering processes designed to filter the remaining rows in the tables using searchable-encryption WHERE EQUALS leaves of the query and add them to the tokenized query tree. For example, in case a WHERE clause with the operator EQUALS appear to search in a certain table, and the attribute is encrypted with searchable-encryption as discloses above, S1 and S2 carry out the searchable encryption search process separately for the rows in the table. In step 513, S1 and S2 conduct search on data fields with queries comprising logical expressions using MPC. Such logical expressions may be >, <, = and the like. Step 515 discloses an optional step in which S1 and S2 may conduct the encrypted mix protocol in order to generate a copy of the database under a different sharing of the database in random order, as disclosed in FIG. 2. Thus, the SQL query process can utilize the newly generated database copies held by S1 and S2 wherein the database tables may be encrypted with XOR and/or additive shares.

Step 520 discloses a process conducted by S1 and S2 for executing the remaining SQL query operations on the database copies generated in step 515, by utilizing the tokenized query trees. Such remaining SQL query operations may be SQL operations which were not carried out in steps, 510, 512, or 513. In some embodiments of the present invention the tokenized query tree may be based on a PostgreSQL expression tree. The SQL operations of the underlying query may be performed on the encrypted database residing on S1 and S2. Thus, the SQL operation may be conducted according to the specification of the encryption process as defined in FIG. 8 beneath.

Step 525 shows S1 and S2 return the values which met the underlying SQL query. Such values can be the tables, the arrays, the data, the column, and the like, in accordance to the SQL original query. In some cases, S1 and S2 may return XOR or additive shares of the result to the SMPC proxy server and the SMPC proxy server may calculate the final result.

Figure 6:
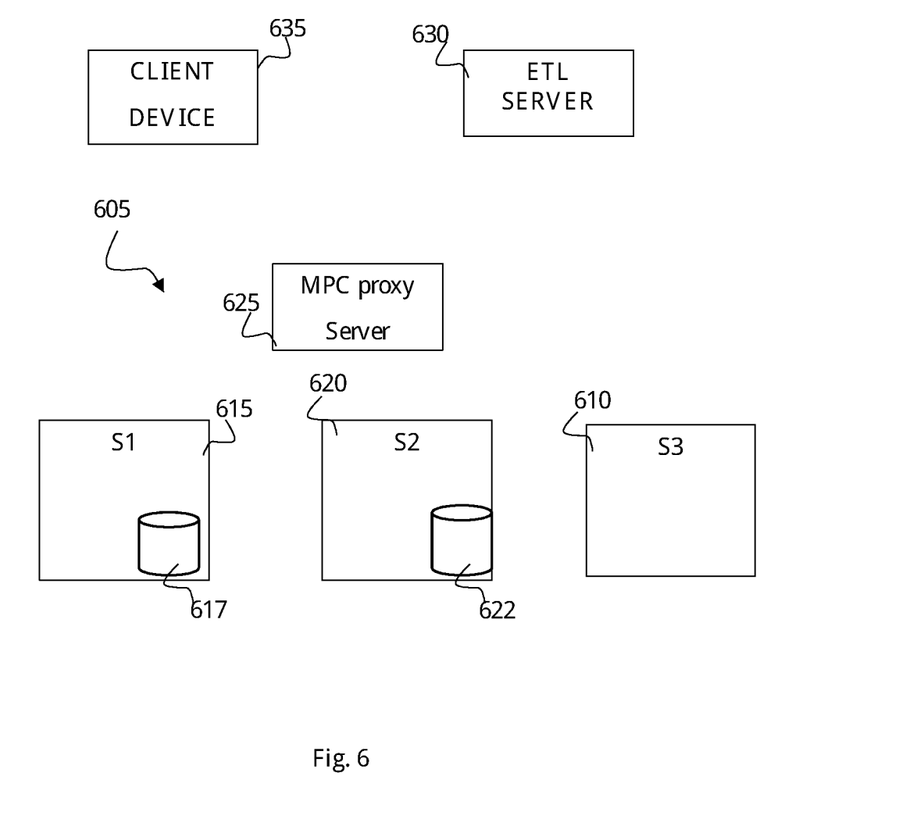
FIG. 6 discloses a computerized system comprising a databased split into two database servers, an ETL server designed to load data to the database, and an auxiliary server S3 who is used to accelerate MPC computations, according to exemplary embodiments of the present invention.

FIG. 6 discloses a computerized system comprising a databased split into two database servers, an ETL server designed to load data to the database, and an auxiliary server S3 who is used to accelerate MPC computations, according to exemplary embodiments of the present invention. FIG. 6 shows a computerized system 605 comprising an S1 server 615, an S2 server 620, an S3 server 610, and an SMPC proxy server 625. The servers, S1 server 615, and S2 server 620 are designed to host the database which may be split into two copies. S1 server 615 comprises a database 617 configured to store one copy of the database copies and S2 server S1 server 620 comprises a database 622 configured to store another copy of the database copies. The database 617 and 622 can be configured to host the encrypted database and store the shares may be an encrypted form of the values in the database. For example, in case a value x is stored in the databases 617 and 622, the value x is XOR shared by choosing a random $X_1 \in \{0,1\}^{|x|}$ and setting $X_2 = X \oplus X_1$ where $\oplus$ represents the XOR operation, and |x| represent the length of the value x. Thus, the share $X_1$ may be stored in database 617 and the share $X_2$ may be stored in database 622. In some cases, additive shares between the S1 server 615 and S2 server 620, and a probabilistic searchable encryption may also be used and stored in the servers S1 server 615 and S2 server 620. The computerized system 605 also comprises a S3 server 610 which may be used as an auxiliary server designed to accelerate the secure computation protocols conducted by the computerized system 605. For example, S1 server 615 and S2 server 620 can send their XOR shares to S3 server 610. Then S3 server 610 can reconstruct the completed encrypted value and utilize the searchable-encryption key ($K_3$) to perform the search of the underlying query.

The SMPC proxy server 625 shown in FIG. 6 may be configured to receive the SQL queries and send them to the S1 server 615, S2 server 620 and S3 server 610. The SMPC proxy server 625 may be configured to receive the SQL query, encrypt the SQL query and send an encrypted query to the S1 server 615, S2 server 620 and S3 server 610, in order to process the SQL query without revealing any plaintext data. The SMPC proxy 625 may also be configured to receive the results of the SQL query. The results of the SQL query may be provided in random shares in such a method which allows only the SMPC proxy server 610 to be able to receive the answer. FIG. 6 also shows an ETL server 630 designed to extract, transform, and load data into the database resides in S1 server 615 and S2 server 620. In some cases, the ETL server may be configured to ask S1 server 615 and S2 server 620 a proof for their identity.

FIG. 6 also shows a client device 635 which may request to perform a query in the database stored in S1 and S2. The client device 635 may operate a software application configured to connect to the database stored in S1 and S2 via the SMPC proxy server 620. In some cases, the client device 635 may send query commands, such as SQL commands, to the SMPC proxy server 620. In some other cases, the client device 635 may send a query tree to SMPC proxy server in order to initiate the query process performed by SMPC proxy server 620.

Figure 7:
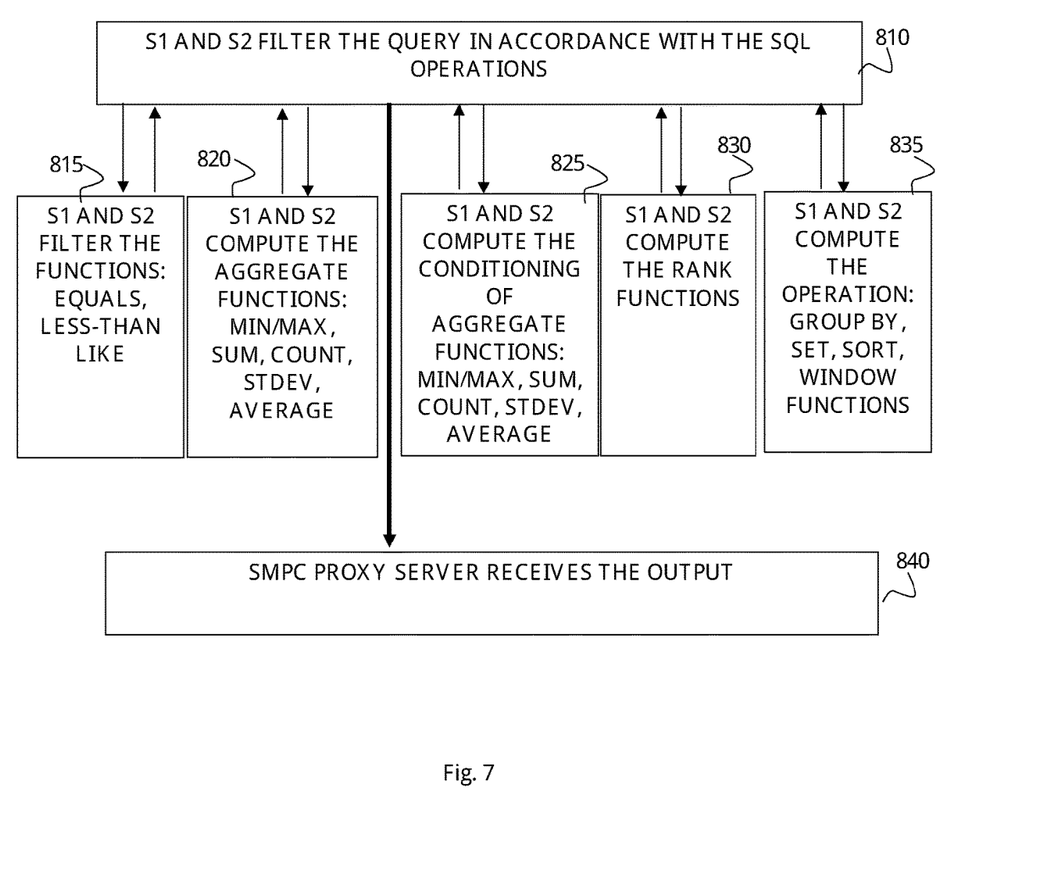
FIG. 7 discloses a method of processing basic SQL operations in the underlying SQL query flow, according to exemplary embodiments of the present invention.

FIG. 7 discloses a method of processing basic SQL operations in the underlying SQL query flow, according to exemplary embodiments of the present invention. In step 810 S1 and S2 initiate the SQL query processing by filtering the query according to the SQL required operations. In some cases, this process may start after the encrypted mix protocol has completed. The computerized system may be configured to process the SQL query as defined in step 815, 820, 825, 830, and 835, in accordance with the query tree structure.

Step 815 discloses filtering different types of values with separate methods. The filtering is conducted as the following:

First type is the Conditions on Plaintext Data Attributes. In this type of filtering, each of S1 and S2 can search the data field locally. If this filtering is carried after the encrypted mix protocol, then the plaintext data was replaced with shared values in the encrypted mix protocol. Thus, when a condition of this type is encountered after the encrypted mix protocol, S1 and S2 send their shares to S3 who reconstructs the values, computes the condition, and sends back the results (where the results include the row indices only of the values meeting the condition). This same methodology is used for all types of operations where plaintext values only are involved (e.g., aggregating plaintext values, joining between plaintext values, etc.); we do not repeat this below.

Second type is the WHERE EQUALS on Data with Searchable Encryption-Enabled. In this type of search, each of S1 and S2 can filter locally using the searchable encryption search process. If this filtering is carried out after the encrypted mix protocol, then the searchable encryption values (I.E., cyphertexts) were replaced with shared values in the encrypted mix protocol. Thus, when a condition of this type is encountered after the encrypted mix protocol, S1 and S2 send their XOR shares of the searchable encryption values to S3. Then S3 reconstructs the complete encrypted values and then utilizes the searchable-encryption key ($K_3$) to perform the search of the underlying query. S3 returns to S1 and S2 the result which consists only of the row indices of the values meeting the condition.

Third type: Other Values: This type refers to other values which may not be any of the first type nor the second type: In this type, garbled circuits secure computation or any other MPC can be used to compute the result of the condition with S1, S2. In some cases, S3 may be used to accelerate the MPC computation and an honest majority may be assumed.

Step 820 discloses computing the values in case of MIN/MAX, SUM, COUNT, STDEV and AVERAGE aggregate functions are used on the shares in the underlying query. The methods are defined as the following:

MIN/MAX: This uses the XOR shares of the values. The servers initialize their state by taking the sharing of the first value in the list. Then, at every step the S1 and S2 take the shares of the current MIN/MAX together with the shares of the next value and compute the following function with secure computation, wherein in some cases this computation can take place via MPC protocol utilizing garbled circuits with S1, S2 and S3:

a. For the minimum value the MPC protocol computes shares of the smaller value between two values and send one share back to S1 and the other share back to S2.

b. For the maximum value the MPC protocol computes shares of the larger value between two values and send one share back to S1 and the other share back to S2.

After processing all values in the list, S1/S2 hold shares of the MIN/MAX value.

SUM: In this case of this aggregate function, S1 and S2 use their given additive shares, and each server, S1 and S2, simply locally sums its shared values modulo $2^{128}$.

COUNT: In this case of this aggregate function, the aggregate function can be computed in plaintext since each server can count the number of transactions remaining in the table.

COUNT-DISTINCT: In this case of operation the query may utilize the secure matching protocol disclosed in FIG. 3.

AVERAGE: In this case of this aggregate function, S1 and S2 compute additive shares of SUM, and store these shares along with the COUNT of the values in the average.

STDEV: In this case of an aggregate function, S1 and S2 use the additive shares of the values and the squares of the values. In this case, the following formula can be utilized ( ):

$$STDEV(x) = \sqrt{\frac{n \cdot (\Sigma_{i=1}^{n} x_i) - \Sigma_{i=1}^{n}(x_i)^2}{n(n-1)}}$$

Wherein n represents the count. In this case of STDEV, S1 and S2 locally compute the shares of the values SUM and SUMSQUARES where SUMSQUARES is computed by locally summing the additive shares of the squares of the values and of their square modulo $2^{128}$, and then of COUNT·SUM−SUMSQUARES. Finally, S1 and S2 store these shares along with COUNT.

Step 825 discloses computing the conditioning of aggregate functions in case this further processing may be require in the underlying query, which in some cases can take place after a completion of step 820. For example, in case of an HAVING query, a further processing to calculate the conditional statement is required. The calculation may be a condition on any of the aggregates computed as above. In such a case, S1 and S2 hold XOR or additive shares of the result, and can use garbled circuits or any other known MPC protocol to execute the comparisons (equality, less-than, etc.) and receive back the answer.

Step 830 discloses computing rank functions as a part of the underlying query. The rank function may be defined as the following functions: NTILE, PERCENTILE, RANK, PERCENT_RANK and DENSE_RANK. In case of rank functions the S1 and S2 may compute a secure sort by using any sorting algorithm based on comparisons, where the LESS-THAN operation may be replaced with a secure computation using garbled circuits or any other known secure MPC protocol that returns the result to S1 and S2. Finally, once given the sorted values, each of S1 and S2 locally computes the rank function.

Step 835 discloses a method to compute the MATCH operations, the SORT function and the WINDOWS function as a part of the SQL query. For the MATCH operation, the operations GROUP BY, JOIN, and SET, S1 and S2 may utilize the secure protocol for executing SQL MATCH operations in a secured fashion, as disclosed in FIG. 3 In case the underlying query comprises a SORT, the servers perform a secure sort, where the LESS-THAN operator is replaced with a secure computation using garbled circuits or any other methods known to persons having ordinary skill in the art. In some cases, wherein the WINDOWS function may operate in the underlying query, and a set of rows and return a single value for each row from the underlying query, the function may be replaced by a SORT operation.

Step 840 discloses returning the results of the underlying SQL query by S1 and S2, back to the SMPC proxy server once the query process has completed. In some cases, wherein S1 and S2 may have the XOR or additive shares of the result, then these shares can be sent to the SMPC proxy server which can compute the actual value. In cases, wherein of an AVERAGE function, wherein S1 and S2 hold the shares of the SUM and in some cases, the COUNT value, S1 and S2 may send the values to the SMPC proxy server which can add the shares modulo $2^{128}$ to obtain the actual sum, and divides it by the count in order to obtain the average. In other cases, such as STDEV function, wherein S1 and S2 hold the shares of the SUM operator and the shares of the COUNT operator, S1 and S2 may send the shares to the SMPC proxy server. Then, the SMPC proxy server may add the shares of the numerator modulo $2^{128}$, divide the result by COUNT·(COUNT−1) over the integers, and then take the square-root to be the result.

Figure 8:
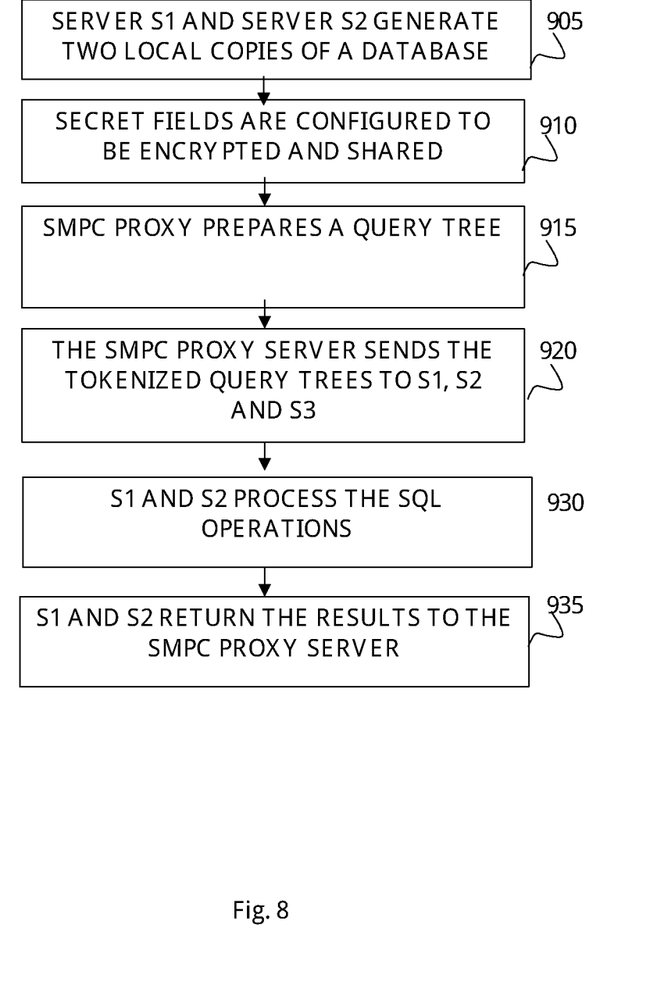
FIG. 8 discloses a method of loading data into an SQL database residing in S1 and S2, and conducting an SQL query process on the SQL database, according to exemplary embodiments of the present invention.

FIG. 8 discloses the process of loading data into an SQL database residing in S1 and S2, and then conducting an SQL query process on the SQL database, according to exemplary embodiments of the present invention. In step 905, S1 and S2 create two local copies of an empty databases. In step 910, the database secret fields may be configured to be XOR shared between server S1 and server S2, and the database's secret numeric fields may be configured to be encrypted as well with additive secret sharing. In some cases, a number of additive sharing methods may be utilized to encrypt the hidden numeric fields, in accordance with the possibility of an SQL to be used on that value. Step 915 discloses the SMPC proxy server preparing the query tree for the underlying SQL query. The query tree may comprise the SQL query operations and the related tables with the relations that are used in the query. Step 920 shows the SMPC proxy server preparing and sending the tokenized query tree to S3, and then preparing the tokenized query trees to S1 and to S2. In some cases, the values in the search conditions part of the tokenized query tree sent to S3 may be removed.

Step 930 discloses S1 and S2 processing the SQL query operations on the database copies generated in step 920, utilizing the tokenized query trees. The SQL operations of the SQL underlying query may be performed on the encrypted database residing on S1 and S2. Thus, the SQL operation may be conducted according to the specification of the encryption process as defined in FIG. 8. Step 935 shows the part where S1 and S2 rerun the values which met the underlying SQL query. Such values can be the tables, the arrays, the data, the column, and the like, in accordance to the SQL original query. In some cases, S1 and S2 may return XOR or additive shares of the result to the SMPC proxy server and the SMPC proxy server may calculate the final result.

While the disclosure has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings without departing from the essential scope thereof. Therefore, it is intended that the disclosed subject matter not be limited to the particular embodiment disclosed as the best mode contemplated for carrying out this invention, but only by the claims that follow.

The invention claimed is:

1. A method operated on a computerizing system having a first server having a first database, a second server having a second database, the method comprising:
   generating two secret shares of at least some of the data fields in a database;

encrypting at least some of the data fields in a database using a method based on probabilistic searchable encryption;

loading the two secret shares generated from the data fields of the database and the encrypted data fields into the first database and the second database, wherein one secret share of the two secret shares is loaded into the first database and another secret share of the two secret shares is loaded into the second database and the encrypted data fields are loaded into the first database and the second database;

receiving a request to perform a query in the database, wherein the query comprises an EQUALS clause;

processing the query first via the EQUALS clause by filtering shares of the first database and the second database using the searchable encryption process independently;

processing the rest of said query using a Multi-Party Computation (MPC) process performed on the secret shares held by the servers, wherein the database fields employed by the query process and the query results remain secret during the entire processing; and revealing the secret query results.

2. The method of claim 1, further comprises sending secret query results to another secured party, said secured party decrypts the query results.

3. The method of claim 1, comprising performing an encrypted mix protocol by generating a copy of the database under a different sharing of the database in a random order.

4. The method of claim 1, wherein the two secret shares become secret using a XOR based method; or using a method based on additive secret sharing; or a method based on probabilistic searchable encryption.

5. The method of claim 1, further comprising:

preparing a tokenized query tree, wherein said tokenized query tree is a query tree where at least some of the tables' names or arrays' names in the query tree are replaced with tokens;

splitting the part of the values of the search conditions in the tokenized query tree into random shares; and sending two tokenized query trees for the first server and the second server, wherein the values in the search conditions are shared between the two tokenized query trees.

6. The method of claim 1, wherein the processing of the query utilizes a secret query tree; or comprises a garbled circuit based MPC process.

7. The method of claim 6, wherein an auxiliary server processes the query using garbled circuits.

8. The method of claim 6, wherein the processing of the query uses a secure MPC process.

9. The method of claim 1, wherein processing of the query comprises creating a copy of the database rearranged in a random order.

10. A computerizing system comprising, a first server having a first database, a second server having a second database, wherein the first database stores one secret share of data fields of a database and the second database stores a second secret share of the same data fields of the database, wherein at least some of the data fields in the database are encrypted using a method based on probabilistic searchable encryption;

a Multi-Party Computation (MPC) server processing query operations on the database, wherein the data fields remain encrypted during the entire query process, wherein said processing comprises receiving a request to perform a query in the database, wherein the query comprises an EQUALS clause, processing the query first via the EQUALS clause by filtering shares of the first database and the second database using the searchable encryption process independently, and processing the rest of said query using an MPC process performed on the secret shares held by the servers.

11. The computerized system of claim 10, wherein the first database and the second database comprise encrypted data fields.

12. The computerized system of claim 10, wherein the MPC server is configured to decrypt the data fields of the query results.

13. The computerized system of claim 10, wherein the MPC server conducting multiparty computation protocols with the servers comprising the first database and the second database for revealing the data fields.

* * * * *